(12) United States Patent
Lan

(10) Patent No.: US 6,302,613 B1
(45) Date of Patent: Oct. 16, 2001

(54) PIVOT CONNECTOR FOR A FOLDABLE STROLLER FRAME

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/553,853

(22) Filed: Apr. 21, 2000

(51) Int. Cl.⁷ .............................. F16C 11/10; B62B 7/06
(52) U.S. Cl. ..................... 403/102; 403/100; 280/650; 280/642
(58) Field of Search ..................... 403/102, 101, 403/100, 99, 84, 325, 321, 322.1; 280/642, 650; 5/99.1

(56) References Cited

U.S. PATENT DOCUMENTS

| | | | |
|---|---|---|---|
| 5,474,404 | * | 12/1995 | Chien ................................ 403/102 |
| 5,524,503 | * | 6/1996 | Ishikura .......................... 280/642 X |
| 5,605,409 | * | 2/1997 | Haut et al. .......................... 403/102 |
| 5,611,634 | * | 3/1997 | Wang ................................ 403/102 |
| 5,730,542 | * | 3/1998 | Cheng ................................ 403/102 |
| 5,978,987 | * | 11/1999 | Wang ............................ 403/102 X |
| 6,073,957 | * | 6/2000 | Lan ................................. 280/642 |
| 6,196,571 | * | 3/2001 | Chen et al. .................... 280/650 X |
| 6,202,229 | * | 3/2001 | Cheng ........................... 403/102 X |

FOREIGN PATENT DOCUMENTS

16229 * 1/2000 (JP) .

* cited by examiner

*Primary Examiner*—Harry C. Kim
(74) *Attorney, Agent, or Firm*—Greenblum & Berenstein, P.L.C.

(57) ABSTRACT

A pivot connector for a stroller frame includes a mounting seat formed with elongated slots, a pivot plate disposed in and pivoted to the mounting seat, an operating member straddling over the mounting seat, a locking pin mounted on the operating member and extending through the elongated slots, and a biasing spring for biasing the operating member away from the mounting seat. The pivot plate is formed with a locking groove that can be registered selectively with the elongated slots when the pivot plate is pivoted. The locking pin is movable to rear slot portions of the elongated slots when the operating member is moved toward the mounting seat, wherein the locking pin is extendible into and out of the locking groove. The locking pin is further movable to front slot portions of the elongated slots when the operating member is moved away from the mounting seat in order to engage the locking pin with the pivot plate and to arrest pivoting movement of the pivot plate when the locking groove is registered with the elongated slots. The mounting seat is formed with a resilient retaining protrusion. The operating member is formed with a retaining hole for engaging removably the retaining protrusion to retain the locking pin in the front slot portions.

8 Claims, 9 Drawing Sheets

PIVOT CONNECTOR FOR A FOLDABLE STROLLER FRAME

BACKGROUND OF THE INVENTION

1. Field of the Invention

The invention relates to a pivot connector for a foldable stroller frame, more particularly to a pivot connector which can be conveniently operated to permit folding of the stroller frame and which prevents untimely folding of the stroller frame.

2. Description of the Related Art

A foldable stroller frame with a pivot connector for foldably connecting frame members of the stroller frame is known in the art. A conventional foldable stroller frame is generally provided with retaining means for retaining the stroller frame in an unfolded state so as to prevent untimely folding of the stroller frame. The retaining means and the pivot connector are usually provided at different parts of the stroller frame. This complicates the structure of the stroller frame, and results in inconvenience during the folding and unfolding operations of the stroller frame.

SUMMARY OF THE INVENTION

Therefore, the object of the present invention is to provide a pivot connector which can be conveniently operated to permit folding and unfolding of a stroller frame and which is provided with retaining means to prevent untimely folding of the stroller frame.

Accordingly, the pivot connector of the present invention is adapted for interconnecting first and second frame members of a stroller frame, and includes a mounting seat, a pivot plate, a pivot shaft, an operating member, a locking pin and a biasing spring. The mounting seat has a first end portion adapted to be fastened to the first frame member of the stroller frame, and a second end portion opposite to the first end portion in a first direction. The mounting seat includes a pair of side walls that are spaced apart in a second direction transverse to the first direction and that have front and rear ends opposite to each other in a third direction transverse to the first and second directions. The mounting seat further includes a bridging wall that interconnects the front ends of the side walls. The side walls are formed with aligned elongated slots that extend in the third direction and that have front and rear slot portions opposite to each other in the third direction. The pivot plate is disposed in the second end portion of the mounting seat between the side walls. The pivot plate has a mounting section that is adapted to be fastened to the second frame member of the stroller frame, and a latching section that extends from the mounting section in a fourth direction. The latching section is formed with a locking groove that has first and second groove ends opposite to each other in a fifth direction transverse to the fourth direction, and a restricted access adjacent to the second groove end and opening at one edge of the latching section distal to the mounting section in the fourth direction. The latching section is further formed with a pivot hole proximate to the second groove end of the locking groove. The pivot shaft extends in the second direction between the side walls of the mounting seat adjacent to the rear ends of the side walls, and through the pivot hole in the latching section of the pivot plate so as to mount pivotally the pivot plate on the side walls such that the locking groove in the latching section can be registered selectively with the elongated slots in the side walls. The operating member straddles over the mounting seat, and has a parallel pair of side plates that are disposed respectively adjacent to the side walls of the mounting seat, and an operating portion that is disposed adjacent to the bridging wall of the mounting seat and that interconnects the side plates. The locking pin extends parallel to the pivot shaft, between the side plates of the operating member, and through the elongated slots in the side walls of the mounting seat. The locking pin is movable to the rear slot portions of the elongated slots when the operating member is moved in the third direction toward the bridging wall of the mounting seat, wherein pivoting movement of the pivot plate relative to the mounting seat results in extension of the locking pin into and out of the second groove end of the locking groove via the restricted access, and wherein the pivot connector is adapted to permit pivoting movement of the second frame member relative to the first frame member. The locking pin is further movable to the front slot portions of the elongated slots when the operating member is moved in the third direction away from the bridging wall of the mounting seat in order to dispose the locking pin in the first groove end of the locking groove, engage the locking pin with the latching section, and arrest the pivoting movement of the pivot plate relative to the mounting seat so as to be adapted to prevent the pivoting movement of the second frame member relative to the first frame member when the locking groove is registered with the elongated slots. The biasing spring is disposed between the bridging wall of the mounting seat and the operating portion of the operating member for biasing the operating member to move in the third direction away from the bridging wall of the mounting seat. One of the side walls of the mounting seat is formed with a resilient retaining protrusion between the first and second end portions of the mounting seat. One of the side plates is formed with a retaining hole for engaging removably the retaining protrusion on the mounting seat so as to retain removably the locking pin in the front slot portions of the elongated slots.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
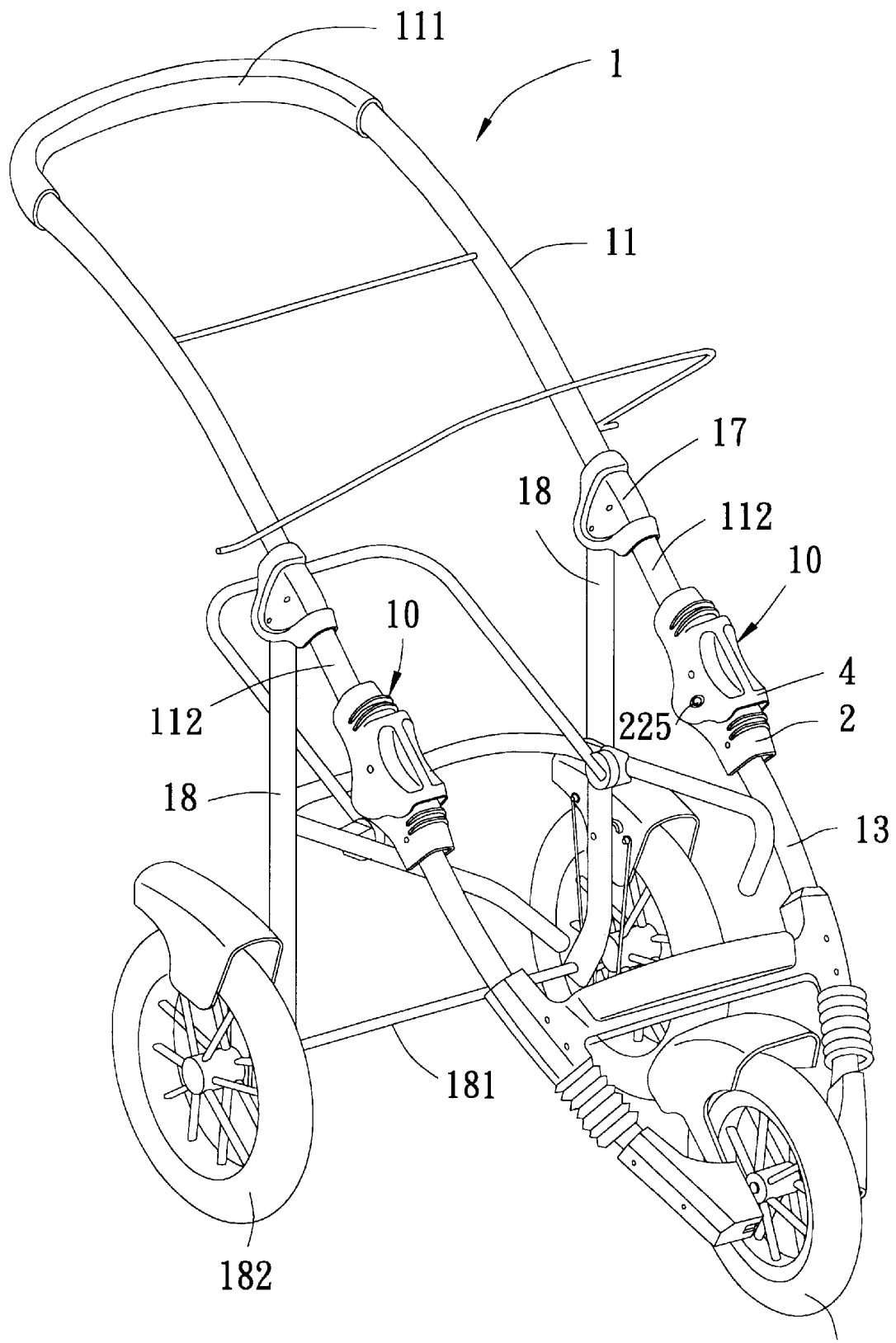
FIG. 1 is a perspective view of a foldable stroller frame incorporating a preferred embodiment of the pivot connector of the present invention.

Referring to FIG. 1, the preferred embodiment of the pivot connector 10 of the present invention is adapted for use in a foldable stroller frame 1 which includes a handle member 11 with a hand grip portion 111 and a parallel pair of forwardly extending side arms 112, a pair of rear support rods 18 mounted pivotally and respectively to the side arms 112 by means of a pair of pivot units 17, a transverse shaft 181 interconnecting the rear support rods 18 and carrying two rear wheels 182 at two opposite ends thereof, and a pair of forwardly extending side tubes 13 for mounting a front wheel 16 thereon. The pivot connector 10 of the preferred embodiment is adapted for connecting foldably a respective one of the side tubes 13 to a respective one of the side arms 112 of the handle member 11.

Figure 2:
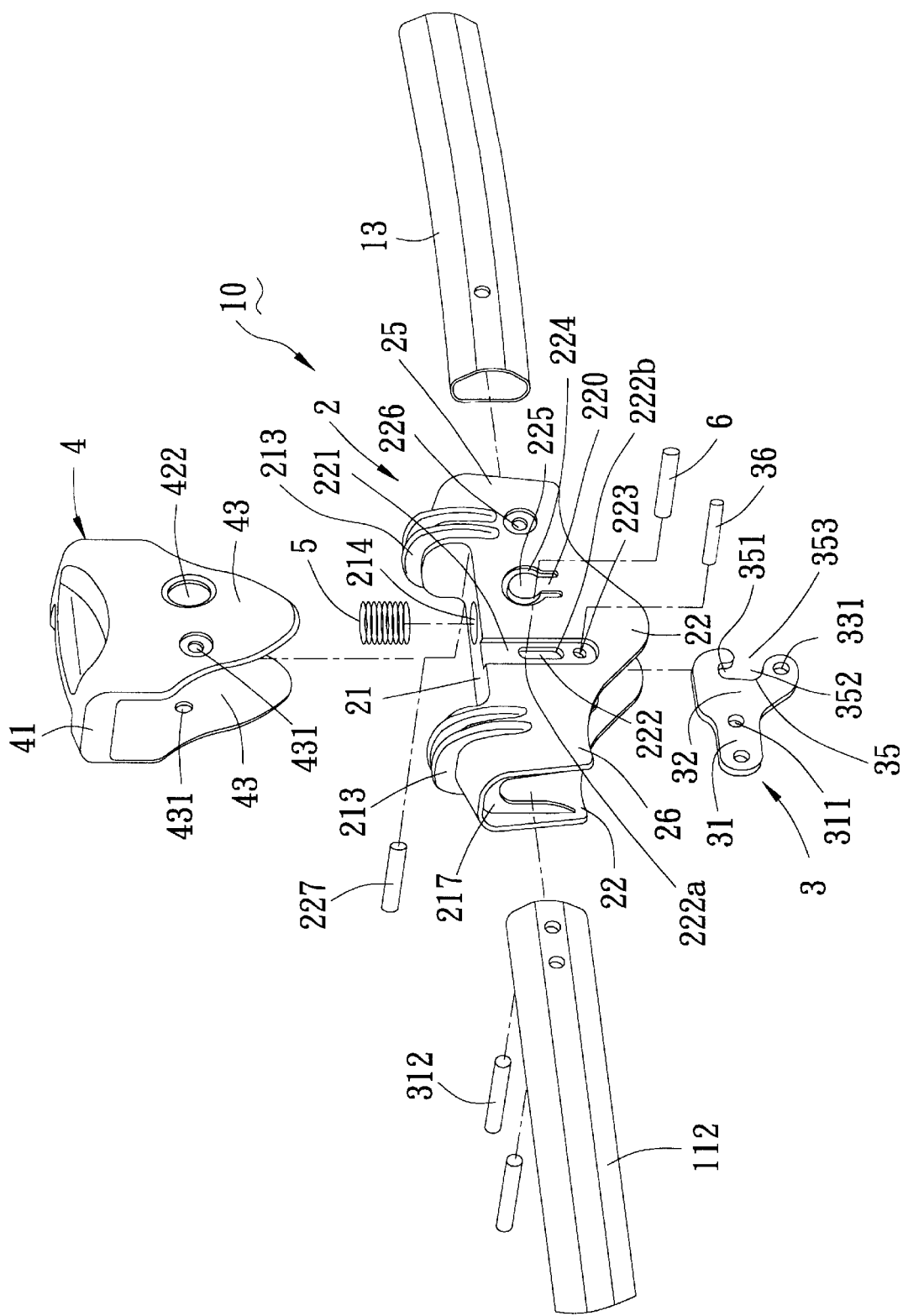
FIG. 2 is an exploded perspective view of the pivot connector of the preferred embodiment.
Figure 3:
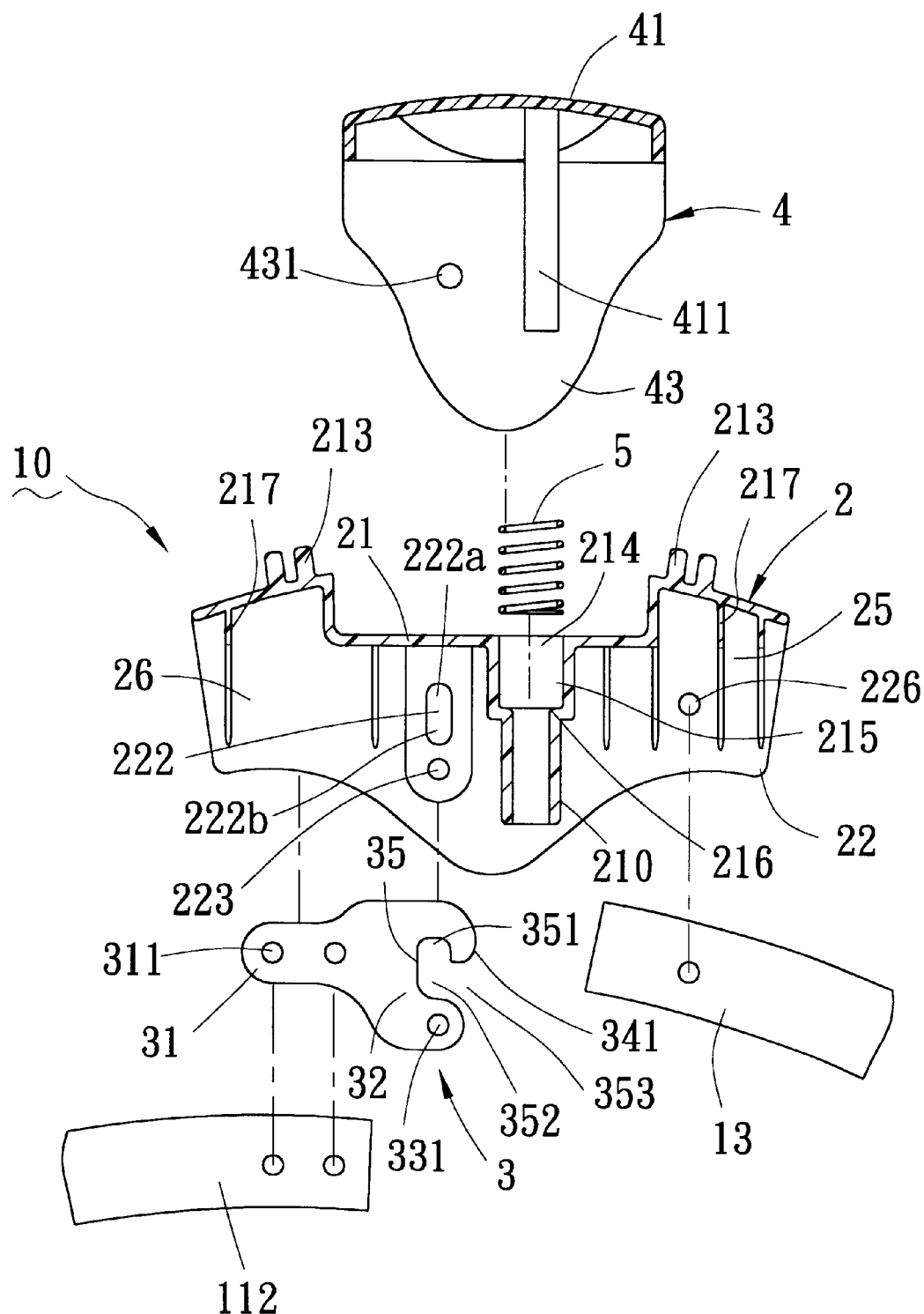
FIG. 3 is an exploded sectional view of the preferred embodiment.

Referring to FIGS. 2 and 3, the pivot connector 10 of the preferred embodiment is shown to include a mounting seat 2, a pivot plate 3, a pivot shaft 36, an operating member 4, a locking pin 6, and a biasing spring 5.

The mounting seat 2 has a first end portion 25 and a second end portion 26 opposite to the first end portion 25 in a first direction. The mounting seat 2 has a generally inverted U-shaped cross-section, and includes a parallel pair of side walls 22 which are spaced apart in a second direction transverse to the first direction and which have front and rear ends that are opposite to each other in a third direction transverse to the first and second directions, and a bridging wall 21 interconnecting the front ends of the side walls 22. The bridging wall 21 has a pair of forwardly extending limiting protrusions 213 which are spaced apart in the first direction, and is formed with a circular opening 214 between the limiting protrusions 213. The mounting seat 2 further has a tubular extension 210 that extends in the third direction from the bridging wall 21 around the opening 214, and that is disposed between the side walls 22. The tubular extension 210 has a wider first section which is connected to the bridging wall 21 and which confines an axial spring recess 215, and a narrower second section connected to the first section so as to define a radial inward abutment rim 216 in the spring recess 215 and between the first and second sections of the tubular extension 210. Each of the side walls 22 has a lateral outer surface formed with an indention 221, and has an elongated slot 222 and a mounting hole 223 formed in the indention 221. The elongated slot 222 extends in the third direction, and has front and rear slot portions 222a, 222b opposite to each other in the third direction. The mounting hole 223 is aligned with the elongated slot 222 in the third direction, and is disposed adjacent to the rear end of the side wall 22. A first one of the side walls 22 is formed with a cutout 224 between the first and second end portions 25, 26 of the mounting seat 2, and has a resilient member 220 disposed in the cutout 224. The resilient member 220 has one end connected integrally to the side wall 22, and an opposite end formed with a retaining protrusion 225. The side walls 22 are formed with aligned fastener holes 226 in the first end portion 25 of the mounting seat 2 so as to be adapted to permit extension of a fastener 227 therethrough for fastening the first end portion 25 of the mounting seat 2 to the respective side tube 13 of the stroller frame 1. The mounting seat 2 further has a plurality of generally inverted U-shaped ribs 217, each of which extends among the side walls 22 and the bridging wall 21. A first set of the ribs 217 is disposed in the first end portion 25 of the mounting seat 2 for contacting fittingly the respective side tube 13. A second set of the ribs 217 is disposed in the second end portion 26 of the mounting seat 2 for contacting fittingly the respective side arm 112.

The pivot plate 3 is disposed in the second end portion 26 of the mounting seat 2 between the side walls 22. The pivot plate 3 has a mounting section 31 formed with two fastener holes 311 adapted to permit extension of two fasteners 312 therethrough for fastening to the respective side arm 112, and a latching section 32 that extends from the mounting section 31 in a fourth direction. The latching section 32 is formed with a locking groove 35 that has first and second groove ends 351, 352 opposite to each other in a fifth direction transverse to the fourth direction, and a restricted access 353 adjacent to the second groove end 352. The restricted access 353 opens at one edge of the latching section 32 distal to the mounting section 31 in the fourth direction. The latching section 32 has a curved guiding edge 341 which is disposed adjacent to the first groove end 351 of the locking groove 35 and which defines the restricted access 353 of the locking groove 35. The latching section 32 is further formed with a pivot hole 331 proximate to the second groove end 352 of the locking groove 35.

Figure 7:
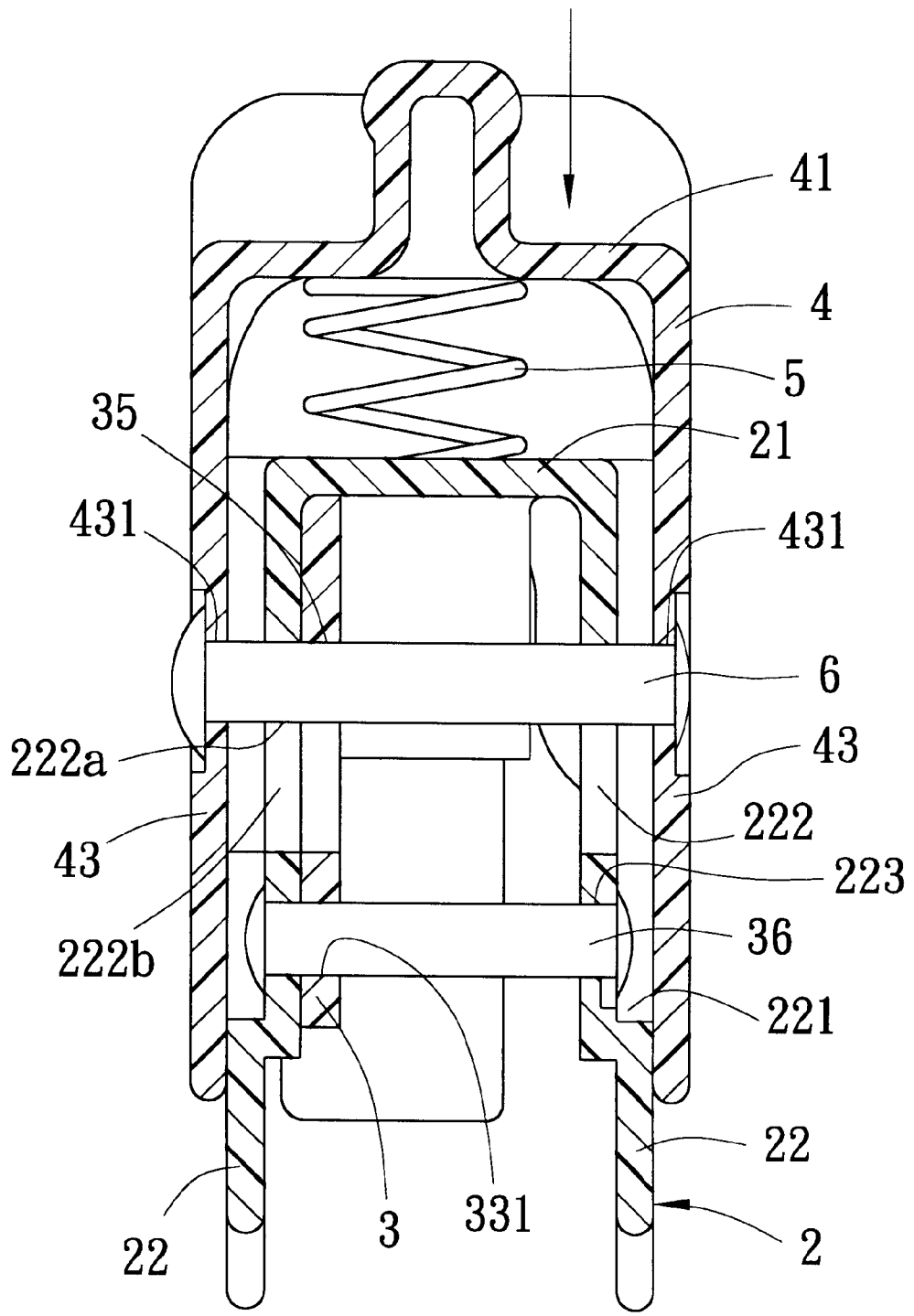
FIG. 7 is another cross-sectional view of the preferred embodiment, taken along line VII—VII in FIG. 5.

The pivot shaft 36 extends in the second direction between the side walls 22 of the mounting seat 2 adjacent to the rear ends of the side walls 22, and through the pivot hole 331 in the latching section 32 of the pivot plate 3, and has two opposite ends mounted on the side walls 22 of the mounting seat 2 at the mounting holes 223, respectively, so as to mount pivotally the pivot plate 3 on the side walls 22 such that the locking groove 35 in the latching section 32 can be registered selectively with the elongated slots 222 in the side walls 22. As shown in FIG. 7, the pivot shaft 36 is in the form of a rivet, and the opposite ends thereof extend through the mounting holes 223 and are disposed in the indentions 221 in the side walls 22, respectively.

Referring again to FIGS. 2 and 3, the operating member 4 straddles over the mounting seat 2, and has a parallel pair of side plates 43 that are disposed respectively adjacent to the side walls 22 of the mounting seat 2, and an operating portion 41 interconnecting the side plates 43 and disposed adjacent to the bridging wall 21 of the mounting seat 2 between the limiting protrusions 213 on the bridging wall 21. The side plates 43 are formed with aligned pin holes 431 that are registered with the elongated slots 222 in the side walls 22 of the mounting seat 2. A first one of the side plates 43 is formed with a retaining hole 422 for engaging removably the retaining protrusion 225 on the first one of the side walls 22 of the mounting seat 2. The operating member 4 further has a positioning rod 411 which extends in the third direction from the operating portion 41 and which is disposed between the side plates 43. The positioning rod 41 extends into the tubular extension 210 via the opening 214 in the bridging wall 21 of the mounting seat 2.

Referring to FIGS. 2, 3 and 7, the locking pin 6 extends parallel to the pivot shaft 36 between the side plates 43 of the operating member 4, and through the elongated slots 222 in the side walls 22 of the mounting seat 2. The locking pin 6 has two opposite ends extending respectively through the pin holes 431 in the side plates 43 for retention on the side plates 43 of the operating member 4. The locking pin 6 is slidable along the elongated slots 222 between the front and rear slot portions 222a, 222b when the operating member 4 is moved in the third direction toward and away from the bridging wall 21 of the mounting seat 2.

Figure 6:
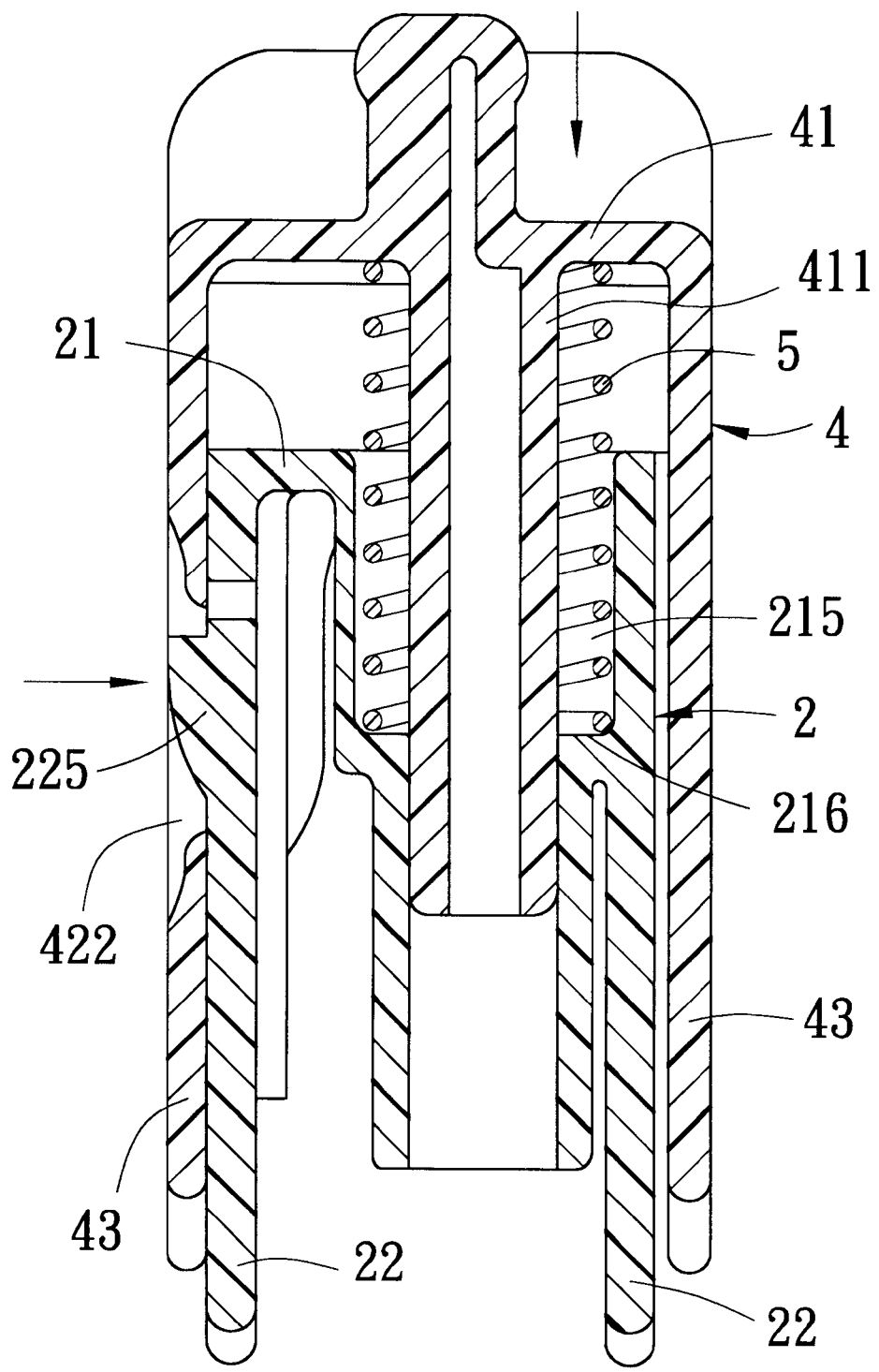
FIG. 6 is a cross-sectional view of the preferred embodiment when an operating member thereof is in a non-depressed position, taken along line VI—VI in FIG. 5.

Referring to FIG. 6, the biasing spring 5, which is in the form of a coiled compression spring, is received in the spring recess 215 and is disposed around the positioning rod 411. The biasing spring 5 has one end abutting against the abutment rim 216 in the spring recess 215, and another end abutting against the operating portion 41 of the operating member 4 for biasing the operating member 4 to move in the third direction away from the bridging wall 21 of the mounting seat 2.

Figure 8:
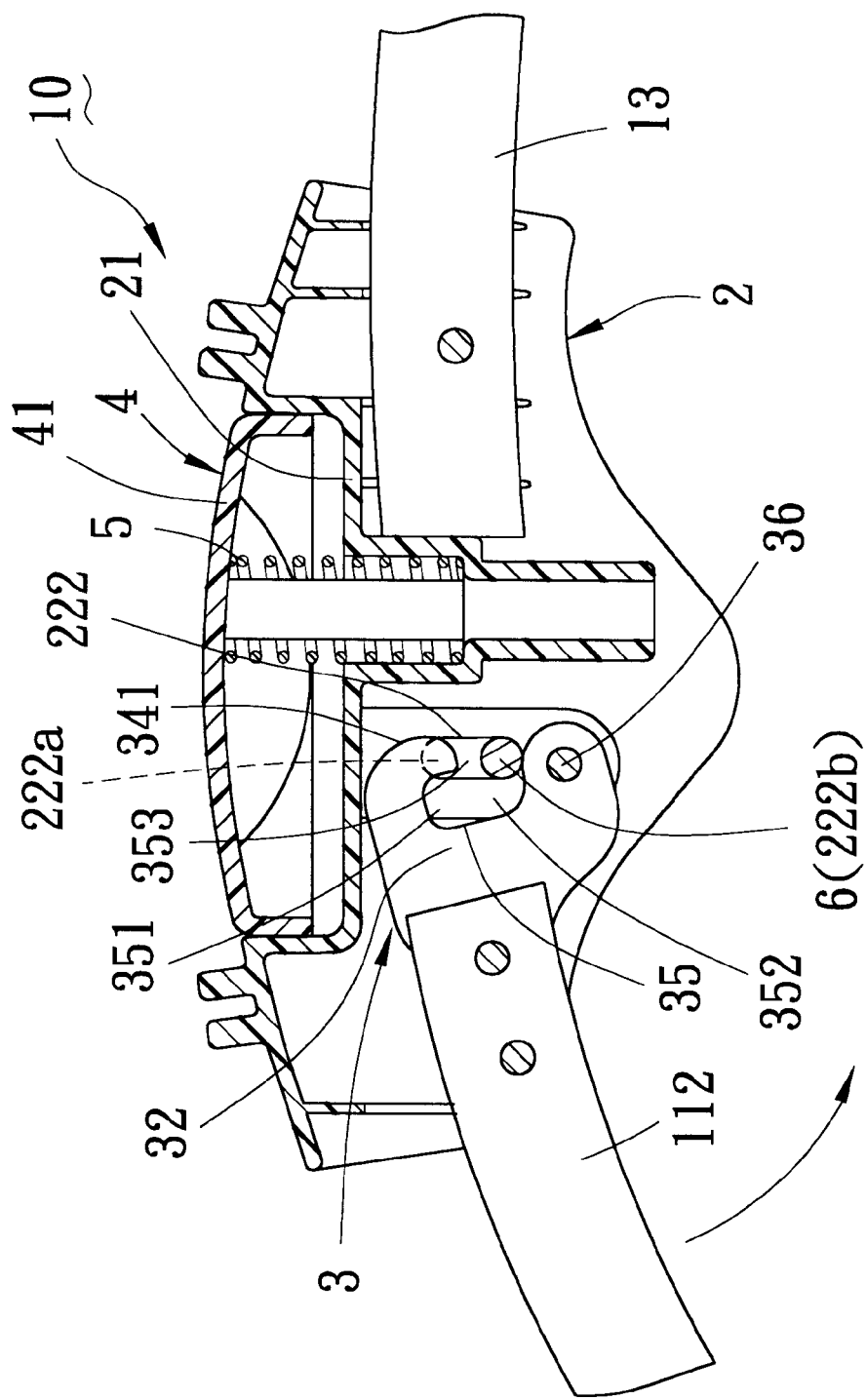
FIG. 8 is a sectional view of the preferred embodiment when the operating member is in a depressed position.

Referring to FIG. 8, when the operating member 4 is moved in the third direction toward the bridging wall 21 of the mounting seat 2, the locking pin 6 is moved to the rear slot portions 222b of the elongated slots 222. In this situation, pivoting movement of the pivot plate 3 about the pivot shaft 36 relative to the mounting seat 2 will cause the locking pin 6 to extend into and out of the second groove end 352 of the locking groove 35 via the restricted access 353. At this time, pivoting movement of the respective side arm 112 relative to the respective side tube 13 is permitted.

Figure 4:
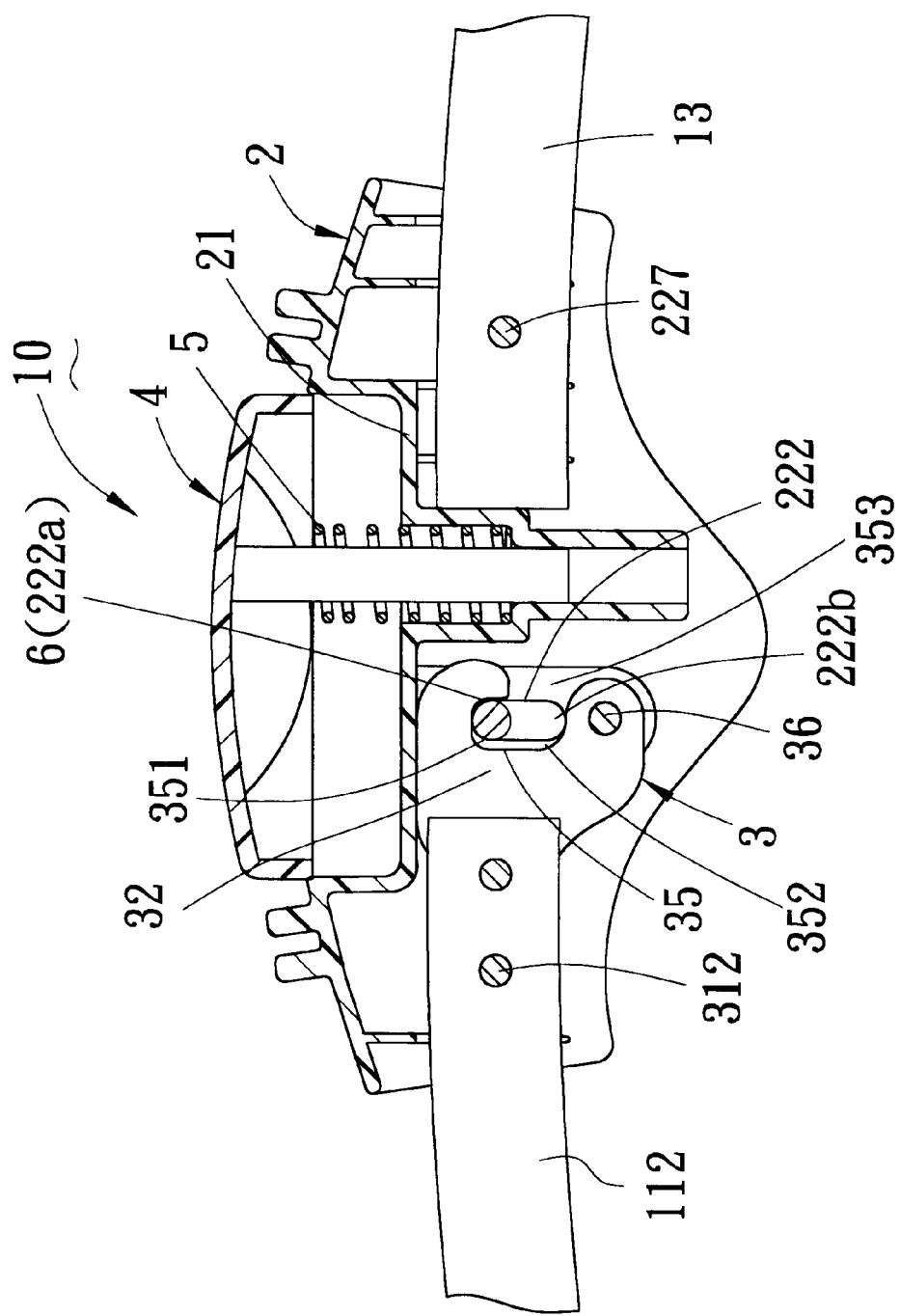
FIG. 4 is an assembled sectional view of the preferred embodiment.

Referring to FIG. 4, when the operating member 4 is moved in the third direction away from the bridging wall 21 of the mounting seat 2, the locking pin 6 is moved to the front slot portions 222a of the engaging slots 222 in order to dispose the locking pin 6 in the first groove end 351 of the locking groove 35 when the locking groove 35 is registered with the elongated slots 222. The locking pin 6 thus engages the latching section 32 of the pivot plate 3 so as to arrest the pivoting movement of the pivot plate 3 relative to the mounting seat 2 and so as to be adapted to prevent the pivoting movement of the respective side arm 112 relative to the respective side tube 13.

Figure 5:
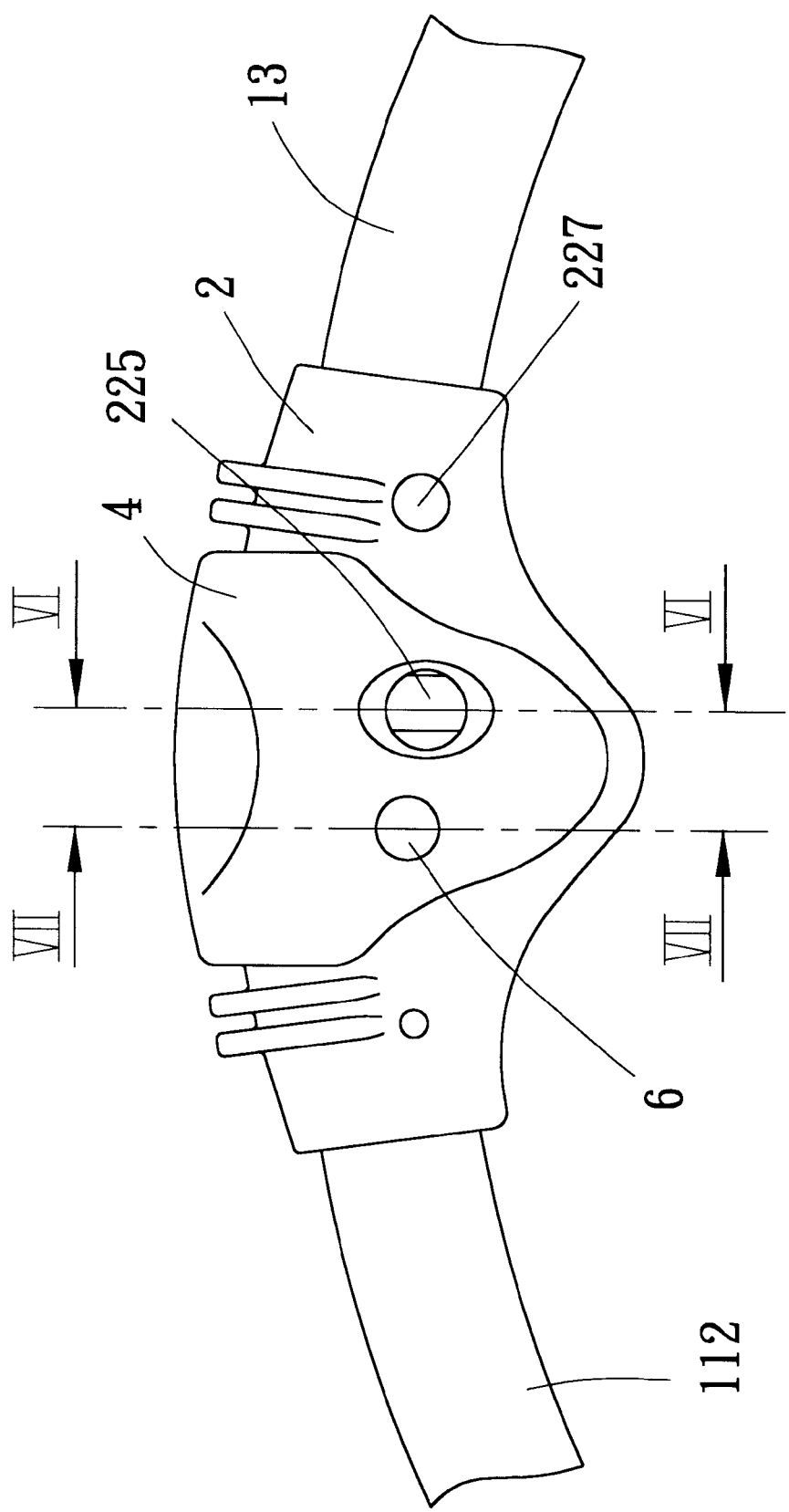
FIG. 5 is a side view of the preferred embodiment.

Referring to FIGS. 4 to 6, when the respective side arm 112 is in an unfolded state relative to the respective side tube 13, the locking groove 35 in the pivot plate 3 is registered with the elongated slots 222. Due to the biasing action of the biasing spring 5, the locking pin 6 is normally moved to the front slot portions 222a of the elongated slots 222, and is disposed in the first groove end 351 of the locking groove 35 for engaging the latching section 32 of the pivot plate 3. As such, pivoting movement of the pivot plate 3 relative to the mounting seat 2 is arrested, and pivoting movement of the respective side arm 112 relative to the respective side tube 13 is thus prevented. At this time, the retaining protrusion 225 on the mounting seat 2 engages the retaining hole 422 in the operating member 4 for retaining the locking pin 6 in the front slot portions 222a of the elongated slots 222, thereby retaining the respective side arm 112 in the unfolded state relative to the respective side tube 13.

Referring to FIGS. 6 and 8, when it is desired to fold the respective side arm 112 toward the respective side tube 13 for folding the stroller frame 1, firstly, the retaining protrusion 225 is depressed to disengage from the retaining hole 422. Then, the operating portion 41 of the operating member 4 is depressed to move the operating member 4 in the third direction toward the bridging wall 21 of the mounting seat 2 against the biasing action of the biasing spring 5. The locking pin 6 is thus moved with the operating member 4 to the rear slot portions 222b of the elongated slots 22, and is moved to the second groove end 352 of the locking groove 35. At this time, pivoting movement of the pivot plate 3 about the pivot shaft 36 in a direction for folding the respective side arm 112 toward the respective side tube 13 will cause the locking pin 6 to extend out of the second groove end 352 of the locking groove 35 via the restricted access 353 for disengaging from the latching section 32 of the pivot plate 3. The pivot connector 10 thus permits pivoting movement of the respective side arm 112 relative to the respective side tube 13 at this time.

Figure 9:
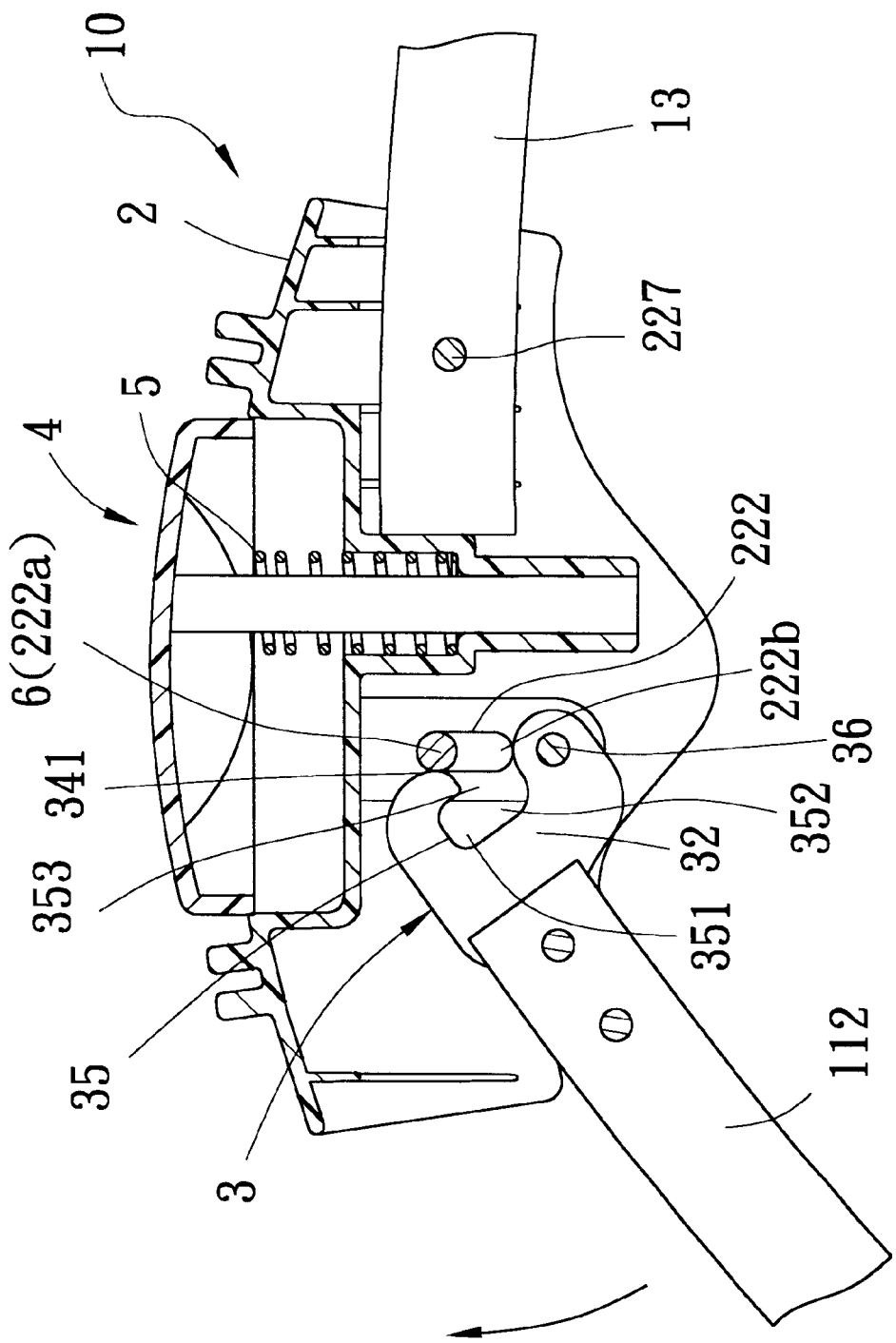
FIG. 9 is a sectional view of the preferred embodiment during an unfolding operation of the stroller frame.

Referring to FIG. 9, when the pivot plate 3 is moved pivotally about the pivot shaft 36 relative to the mounting seat 2 in a direction for unfolding the respective side arm 112 from the respective side tube 13, the curved guide edge 341 of the pivot plate 3 slides past the locking pin 6 and guides the locking pin 6 to move into the locking groove 35 via the restricted access 353. Due to the biasing action of the biasing spring 5, the locking pin 6 is moved to the first groove end 351 after moving into the locking groove 35, and engages the latching section 32 when the pivot plate 3 is continuously pivoted to register the locking groove 35 with the elongated slots 222. Likewise, the retaining protrusion 225 (see FIG. 6) engages the retaining hole 422 at this time to retain the locking pin 6 in the front slot portions 222a of the elongated slots 222, thereby retaining the respective side arm 112 in the unfolded state relative to the respective side tube 13.

It has thus been shown that, by virtue of the engagement between the locking pin 6 and the locking groove 35 in the pivot plate 3, and between the resilient retaining protrusion 225 and the retaining hole 422, the pivot connector 10 of the present invention can retain securely the respective side arm 112 and the respective side tube 13 of the stroller frame 1 in the unfolded state. Untimely folding of the stroller frame can be effectively prevented. Moreover, the pivot connector 10 of the present invention can be conveniently operated to facilitate folding and unfolding of the stroller frame 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pivot connector for interconnecting first and second frame members of a stroller frame, comprising:

a mounting seat having a first end portion adapted to be fastened to the first frame member of the stroller frame, and a second end portion opposite to the first end portion in a first direction, said mounting seat including a pair of side walls that are spaced apart in a second direction transverse to the first direction and that have front and rear ends opposite to each other in a third direction transverse to the first and second directions, said mounting seat further including a bridging wall that interconnects said front ends of said side walls, said side walls being formed with aligned elongated slots that extend in the third direction and that have front and rear slot portions opposite to each other in the third direction;

a pivot plate disposed in the second end portion of said mounting seat between said side walls, said pivot plate having a mounting section that is adapted to be fastened to the second frame member of the stroller frame, and a latching section that extends from said mounting section in a fourth direction, said latching section being formed with a locking groove that has first and second groove ends opposite to each other in a fifth direction transverse to the fourth direction, and a restricted access adjacent to said second groove end and opening at one edge of said latching section distal to said mounting section in the fourth direction, said latching section being further formed with a pivot hole proximate to said second groove end of said locking groove;

a pivot shaft extending in the second direction between said side walls of said mounting seat adjacent to said rear ends of said side walls, and through said pivot hole in said latching section of said pivot plate so as to mount pivotally said pivot plate on said side walls such that said locking groove in said latching section can be registered selectively with said elongated slots in said side walls;

an operating member straddling over said mounting seat and having a parallel pair of side plates that are disposed respectively adjacent to said side walls of said mounting seat, and an operating portion that is disposed adjacent to said bridging wall of said mounting seat and that interconnects said side plates;

a locking pin extending parallel to said pivot shaft, between said side plates of said operating member, and through said elongated slots in said side walls of said mounting seat, said locking pin being movable to said rear slot portions of said elongated slots when said operating member is moved in the third direction toward said bridging wall of said mounting seat, wherein pivoting movement of said pivot plate relative to said mounting seat results in extension of said locking pin into and out of said second groove end of said locking groove via said restricted access, and wherein said pivot connector is adapted to permit pivoting movement of the second frame member relative to the first frame member, said locking pin being further movable to said front slot portions of said elongated slots when said operating member is moved in the third direction away from said bridging wall of said mounting seat in order to dispose said locking pin in said first groove end of said locking groove, engage said locking pin with said latching section, and arrest the pivoting movement of said pivot plate relative to said mounting seat so as to be adapted to prevent the pivoting movement of the second frame member relative to the first frame member when said locking groove is registered with said elongated slots; and a biasing spring disposed between said bridging wall of said mounting seat and said operating portion of said operating member for biasing said operating member to move in the third direction away from said bridging wall of said mounting seat;

one of said side walls of said mounting seat being formed with a resilient retaining protrusion between said first and second end portions of said mounting seat;

one of said side plates being formed with a retaining hole for engaging removably said retaining protrusion on said mounting seat so as to retain removably said locking pin in said front slot portions of said elongated slots.

2. The pivot connector of claim 1, wherein said side walls of said mounting seat are formed with mounting holes that are aligned with said pivot hole in said pivot plate, said pivot shaft having two opposite ends that extend respectively into said mounting holes for mounting on said side walls of said mounting seat.

3. The pivot connector of claim 1, wherein said side plates of said operating member are formed with aligned pin holes that are registered with said elongated slots in said mounting seat, said locking pin having two opposite ends that extend respectively into said pin holes for retention on said side plates, respectively.

4. The pivot connector of claim 1, wherein said biasing spring is in the form of a coiled compression spring.

5. The pivot connector of claim 4, wherein said bridging wall of said mounting seat is formed with a spring recess that extends in the third direction for receiving said biasing spring, said spring recess being formed with a radial inward abutment rim, said biasing spring having one end abutting against said abutment rim, and another end abutting against said operating portion of said operating member.

6. The pivot connector of claim 5, wherein said operating member is formed with a positioning rod that extends in the third direction from said operating portion and that is disposed between said side plates, said positioning rod extending into said spring recess in said mounting seat and having said biasing spring disposed therearound.

7. The pivot connector of claim 1, wherein said restricted access of said locking groove is defined by a curved guide edge adjacent to said first groove end to guide movement of said locking pin into said locking groove when said pivot plate is pivoted about said pivot shaft relative to said mounting seat in a direction for unfolding the second frame member from the first frame member.

8. The pivot connector of claim 1, wherein said retaining protrusion is disposed in a cutout formed in said one of said side walls of said mounting seat.

* * * * *